(12) United States Patent
Sells et al.

(10) Patent No.: US 7,867,534 B2
(45) Date of Patent: Jan. 11, 2011

(54) COOKING APPLIANCE WITH STEAM GENERATOR

(75) Inventors: Joel M. Sells, Soloma, MI (US); Matthew G. Voglewede, St. Joseph, MI (US); Marco Poma, Stevensville, MI (US); Shawn F. Olsson, Hanover Pk., IL (US)

(73) Assignee: Whirlpool Corporation, Benton Harbor, MI (US)

( * ) Notice: Subject to any disclaimer, the term of this patent is extended or adjusted under 35 U.S.C. 154(b) by 822 days.

(21) Appl. No.: 11/583,674

(22) Filed: Oct. 18, 2006

(65) Prior Publication Data

US 2008/0095905 A1  Apr. 24, 2008

(51) Int. Cl.
*A21B 1/02* (2006.01)
(52) U.S. Cl. .................. 426/233; 426/238; 426/510; 426/511; 426/523; 126/369; 126/20
(58) Field of Classification Search .......... 426/231, 426/233, 510, 511, 523, 238; 99/330, 410; 126/369, 20
See application file for complete search history.

(56) References Cited

U.S. PATENT DOCUMENTS

| | | | |
|---|---|---|---|
| 213,029 A | 3/1879 | Ashcroft | |
| 339,228 A | 4/1886 | Smith | |
| 1,332,216 A | 3/1920 | Hodge et al. | |
| 1,544,481 A | 6/1925 | Reese | |
| 1,792,465 A * | 2/1931 | Petersen | 126/20 |
| 1,870,459 A | 8/1932 | Kienk | |
| 2,141,591 A * | 12/1938 | Bonner | 126/20.1 |
| 2,502,172 A * | 3/1950 | Paulsen | 99/324 |
| 2,636,969 A | 4/1953 | Lewis | 219/19 |
| 2,885,194 A * | 5/1959 | Winkler | 261/52 |
| 3,299,800 A | 1/1967 | Angelo | |
| 3,331,943 A * | 7/1967 | Eff | 219/398 |
| 3,364,338 A | 1/1968 | Holtkamp | |
| 3,394,665 A * | 7/1968 | Williams | 118/24 |
| 3,503,760 A * | 3/1970 | Allen | 426/312 |
| 3,518,949 A | 7/1970 | Stock | |
| 3,732,396 A * | 5/1973 | Tucker | 219/401 |
| 3,751,632 A | 8/1973 | Kauranen | |
| 3,814,901 A | 6/1974 | Morhack | |
| 3,815,949 A | 6/1974 | Ulert | |
| 3,820,524 A * | 6/1974 | Buckell | 126/20 |
| 3,839,616 A | 10/1974 | Risman | |
| 3,873,363 A * | 3/1975 | Bakka et al. | 134/22.1 |
| 3,947,241 A | 3/1976 | Caridis et al. | |
| 4,011,805 A | 3/1977 | Vegh et al. | |
| 4,058,635 A | 11/1977 | Durth | |
| 4,245,148 A | 1/1981 | Gisske et al. | |
| 4,258,731 A | 3/1981 | Tsujimoto et al. | 132/9 |
| 4,267,976 A | 5/1981 | Chatwin | 239/102 |

(Continued)

FOREIGN PATENT DOCUMENTS

DE        3909283 A1    10/1990

(Continued)

*Primary Examiner*—Drew E Becker
(74) *Attorney, Agent, or Firm*—Tara M. Hartman; John W. Morrison; McGarry Bair PC

(57) ABSTRACT

An apparatus and method for cooking with steam in a cooking appliance by forming the steam from atomized particles of water.

13 Claims, 2 Drawing Sheets

U.S. PATENT DOCUMENTS

| | | | |
|---|---|---|---|
| 4,367,724 A * | 1/1983 | Willett | 126/20 |
| 4,426,923 A | 1/1984 | Ohata | |
| 4,623,780 A | 11/1986 | Shelton | |
| 4,655,192 A * | 4/1987 | Jovanovic | 126/20 |
| 4,700,685 A | 10/1987 | Miller | 126/20 |
| 4,724,824 A | 2/1988 | McCoy et al. | |
| 4,737,373 A | 4/1988 | Forney | |
| 4,817,582 A | 4/1989 | Oslin et al. | |
| 4,835,368 A * | 5/1989 | Fortmann et al. | 219/401 |
| 4,876,426 A | 10/1989 | Smith | |
| 4,906,485 A | 3/1990 | Kirchhoff | |
| 4,913,039 A | 4/1990 | Sutphen | |
| 4,920,948 A | 5/1990 | Koether et al. | |
| 4,924,071 A | 5/1990 | Jacobs | |
| 4,924,072 A | 5/1990 | Oslin | |
| 4,991,545 A | 2/1991 | Rabe et al. | |
| 5,014,679 A | 5/1991 | Childs et al. | 126/21 |
| 5,075,120 A | 12/1991 | Leary et al. | |
| 5,075,121 A | 12/1991 | Desage et al. | |
| 5,077,065 A | 12/1991 | Ash et al. | |
| 5,171,974 A | 12/1992 | Koether et al. | |
| 5,176,856 A | 1/1993 | Takahashi et al. | 261/142 |
| 5,200,225 A * | 4/1993 | Apaydin | 426/510 |
| 5,209,941 A * | 5/1993 | Wuest | 426/510 |
| 5,215,000 A | 6/1993 | Desage et al. | |
| 5,235,902 A | 8/1993 | Ogawa et al. | |
| 5,279,676 A | 1/1994 | Oslin et al. | |
| 5,318,792 A | 6/1994 | Tippmann | |
| 5,355,840 A | 10/1994 | Violi | |
| 5,367,145 A | 11/1994 | Takagi | |
| 5,369,252 A | 11/1994 | Kondo | |
| 5,411,753 A | 5/1995 | Tippmann | |
| 5,463,940 A | 11/1995 | Cataldo | |
| 5,474,789 A * | 12/1995 | Hayami et al. | 426/335 |
| 5,494,690 A | 2/1996 | Shelton | |
| 5,512,312 A | 4/1996 | Forney et al. | |
| 5,515,773 A | 5/1996 | Bullard | |
| 5,525,782 A | 6/1996 | Yoneno et al. | |
| 5,530,223 A | 6/1996 | Culzoni et al. | 219/401 |
| 5,532,456 A | 7/1996 | Smith et al. | |
| 5,549,038 A | 8/1996 | Kolvites | |
| 5,552,578 A | 9/1996 | Violi | |
| 5,619,983 A | 4/1997 | Smith | 126/348 |
| 5,631,033 A | 5/1997 | Kolvites | |
| 5,640,946 A | 6/1997 | Oslin | |
| 5,662,959 A | 9/1997 | Tippmann | |
| 5,680,810 A | 10/1997 | Sham | |
| 5,694,835 A | 12/1997 | Mangina | |
| 5,710,409 A | 1/1998 | Schwarzbacker et al. | |
| 5,756,970 A | 5/1998 | Barger et al. | |
| 5,768,982 A | 6/1998 | Violi et al. | |
| 5,938,959 A | 8/1999 | Wang | |
| 5,942,142 A | 8/1999 | Forney et al. | |
| 5,945,018 A | 8/1999 | Halen | |
| 5,967,020 A | 10/1999 | Soyama et al. | |
| 6,023,050 A | 2/2000 | Violi | |
| 6,035,763 A | 3/2000 | Yung | |
| 6,040,564 A | 3/2000 | Ueda et al. | 219/682 |
| 6,133,558 A | 10/2000 | Ueda et al. | |
| 6,138,558 A | 10/2000 | Harrington | 100/102 |
| 6,175,100 B1 | 1/2001 | Creamer et al. | |
| 6,188,045 B1 * | 2/2001 | Hansen et al. | 219/401 |
| 6,202,637 B1 | 3/2001 | Roberts | |
| 6,233,464 B1 | 5/2001 | Chmaytelli | |
| 6,267,045 B1 * | 7/2001 | Wiedemann et al. | 99/330 |
| 6,318,246 B2 | 11/2001 | Fukushima et al. | |
| 6,323,464 B1 | 11/2001 | Cohn | |
| 6,323,467 B1 | 11/2001 | Alsafadi | |
| 6,342,262 B1 | 1/2002 | Wuest | |
| 6,453,802 B1 | 9/2002 | Manganiello et al. | |
| 6,497,907 B2 | 12/2002 | Hofer | |
| 6,521,871 B1 | 2/2003 | Shelton | |
| 6,545,251 B2 | 4/2003 | Allera et al. | |
| 6,565,762 B1 | 5/2003 | Silverbrook | |
| 6,570,136 B1 | 5/2003 | Lockwood et al. | |
| 6,572,911 B1 | 6/2003 | Corcoran et al. | |
| 6,666,086 B2 | 12/2003 | Colman et al. | |
| 6,727,478 B2 | 4/2004 | Rael et al. | |
| 6,743,454 B1 | 6/2004 | Gibson et al. | |
| 6,773,738 B2 | 8/2004 | Berger et al. | |
| 6,815,644 B1 | 11/2004 | Muegge et al. | |
| 6,833,032 B1 | 12/2004 | Douglas et al. | |
| 6,900,414 B2 | 5/2005 | Fisher | |
| 6,909,070 B2 | 6/2005 | Veltrop et al. | |
| 6,909,071 B2 | 6/2005 | Shozo | |
| 7,060,941 B1 | 6/2006 | Embury et al. | |
| 7,091,454 B2 | 8/2006 | Cho et al. | |
| 7,113,695 B2 * | 9/2006 | Ono | 392/405 |
| 7,199,340 B2 | 4/2007 | Yamasaki et al. | |
| 7,208,701 B2 | 4/2007 | Fraccon et al. | |
| 7,235,762 B2 | 6/2007 | Gagas et al. | |
| 2001/0051202 A1 | 12/2001 | Hofer | |
| 2002/0179588 A1 | 12/2002 | Lubrina et al. | |
| 2003/0132312 A1 | 7/2003 | Kelly | |
| 2004/0022909 A1 | 2/2004 | Holm et al. | |
| 2004/0226934 A1 | 11/2004 | Moore, Jr. et al. | |
| 2004/0232141 A1 | 11/2004 | Yamasaki et al. | |
| 2004/0256482 A1 | 12/2004 | Linden | 239/102.1 |
| 2004/0261632 A1 | 12/2004 | Hansen et al. | |
| 2005/0034718 A1 | 2/2005 | Van Over | |
| 2005/0051036 A1 | 3/2005 | Erdmann et al. | |
| 2006/0000821 A1 | 1/2006 | Gerola et al. | |
| 2006/0249136 A1 | 11/2006 | Reay | |
| 2006/0251784 A1 | 11/2006 | Sells et al. | |
| 2007/0039488 A1 * | 2/2007 | Hunter et al. | 99/476 |
| 2007/0138160 A1 | 6/2007 | Ando et al. | |
| 2008/0032018 A1 | 2/2008 | Garniss et al. | |
| 2008/0223353 A1 * | 9/2008 | Cristiani | 126/20 |

FOREIGN PATENT DOCUMENTS

| | | | |
|---|---|---|---|
| DE | 4303656 A1 | 8/1994 |
| DE | 19741881 | 3/1999 |
| DE | 10335295 | 3/2005 |
| EP | 0233535 A2 | 8/1987 |
| EP | 0277337 A2 | 8/1988 |
| EP | 0517681 A2 | 12/1992 |
| EP | 0643923 A1 | 3/1995 |
| EP | 0768055 A1 | 4/1997 |
| EP | 0893084 A1 | 1/1999 |
| EP | 0894460 A1 | 2/1999 |
| EP | 1010384 | 6/2000 |
| EP | 1166694 A1 | 1/2002 |
| EP | 1372358 A1 | 12/2003 |
| EP | 1382280 A1 | 1/2004 |
| FR | 2589678 A1 | 5/1987 |
| FR | 2652234 A1 | 3/1991 |
| FR | 2840392 A1 | 12/2003 |
| GB | 15098 A | 2/1910 |
| GB | 2373714 A | 10/2002 |
| GB | 2400298 A | 10/2004 |
| JP | 55068249 | 5/1980 |
| JP | 57077829 A | 5/1982 |
| JP | 6014756 | 1/1994 |
| JP | 8038134 | 2/1996 |
| JP | 9004856 | 1/1997 |
| JP | 2000093341 | 4/2000 |
| JP | 2001346549 A | 12/2001 |
| KR | 2002006215 A | 1/2002 |
| SU | 500788 A | 1/1976 |
| WO | 9534220 A1 | 12/1995 |
| WO | 9734491 A1 | 9/1997 |

| WO | 9852418 | A1 | 11/1998 | WO | 03023285 | A2 | 3/2003 |
| WO | 9933347 | A1 | 7/1999 | | | | |
| WO | 9953767 | A1 | 10/1999 | * cited by examiner | | | |

COOKING APPLIANCE WITH STEAM GENERATOR

BACKGROUND OF THE INVENTION

1. Field of the Invention

This invention generally relates to a cooking appliance that incorporates a fluid into the cooking process.

2. Description of the Related Art

Conventional cooking appliances, such as ovens, for cooking food are well known, and typically comprise a cabinet containing at least one housing defining a cooking chamber and having a heating system for cooking food.

Some cooking appliances introduce water in the form of steam into the cooking chamber to facilitate the cooking process, such as in the baking of bread and pastries. Such cooking appliances use a steam generator that changes the phase of water from liquid to steam by heating liquid water. The steam is then introduced into the cooking chamber.

Heating the liquid water to such an extent, however, undesirably consumes a great deal of energy due to the high specific heat capacity of water created by hydrogen bonding between the water molecules.

SUMMARY OF THE INVENTION

The invention provides a more energy efficient way of using steam in cooking appliance. In one aspect, the invention is a method of forming steam in a cooking chamber of cooking appliance having a housing defining the cooking chamber, comprising atomizing a liquid to form a plurality of particles of the liquid, introducing the particles into the cooking chamber, and maintaining the temperature of air in the cooking chamber at a temperature sufficient to change the phase of the particles in the cooking chamber from liquid to gas to form the steam.

In another aspect, the invention is a cooking appliance comprising a housing defining a cooking chamber, a heating element for heating the cooking chamber, an atomizer for generating particles of liquid and having an outlet for emitting the generated particles, with the outlet directly connected to the cooking chamber such that the emitted particles enter the cooking chamber without subsequent conditioning.

DESCRIPTION OF THE PREFERRED EMBODIMENT

Figure 1:
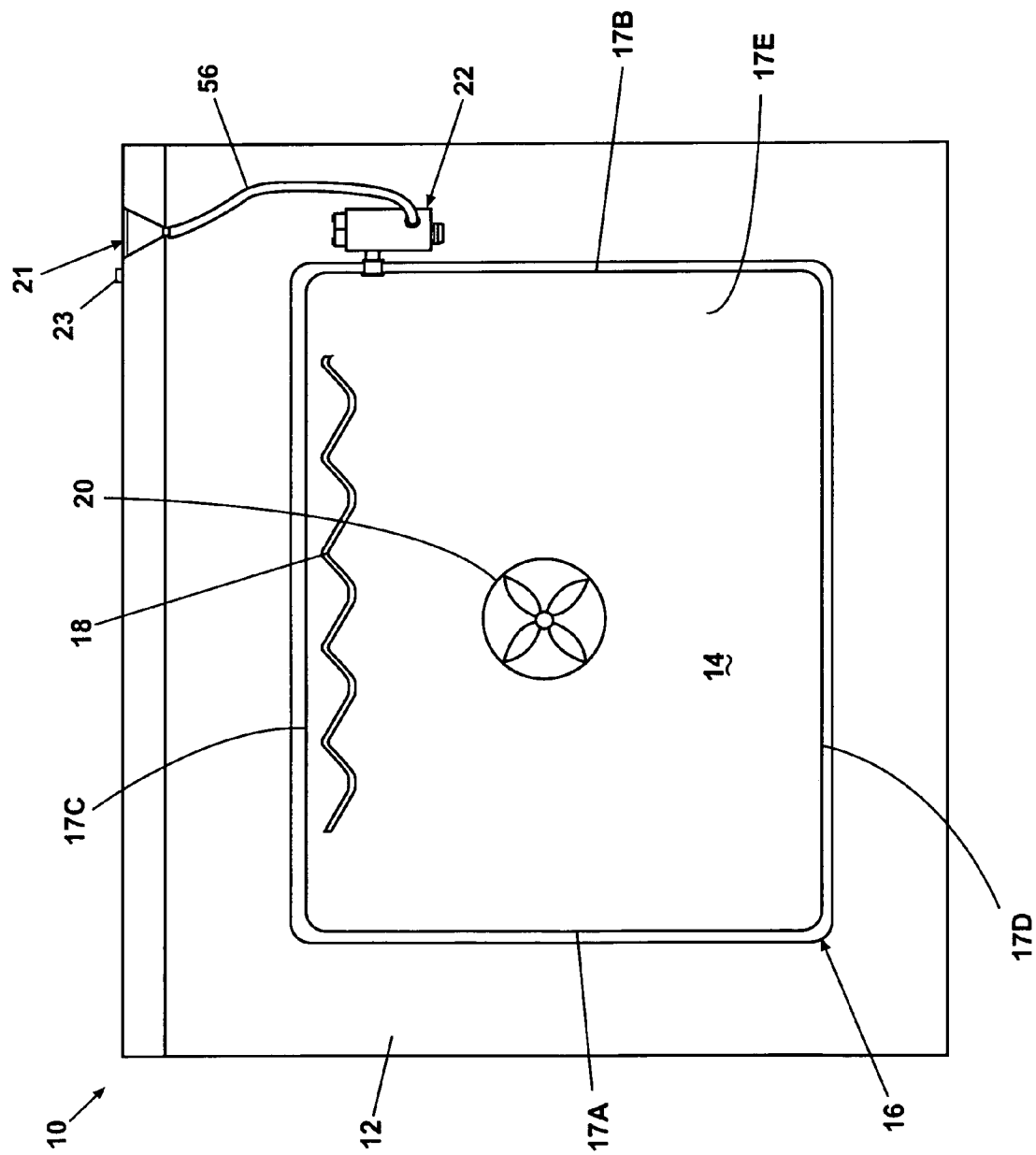
FIG. 1 is a schematic view of a conventional oven with attached atomizer for atomizing liquid water according to one embodiment of the invention.

Referring now to the figures, FIG. 1 schematically illustrates a cooking appliance in the form of a conventional oven 10 according to the invention. The oven 10 comprises a cabinet 12 with an open-face cooking chamber 14 defined by a housing 16. The housing 16 comprises a pair of spaced sides 17A, 17B joined by a top 17C, bottom 17D, and rear 17E. A door (not shown) selectively closes the cooking chamber 14. When the door is in the open position, a user can access the cooking chamber, while the door in the closed position prevents access to the cooking chamber 14 and seals the chamber 14 from the external environment. The oven 10 further comprises an opening 21 located in the top of the oven 10 adapted to receive liquid water.

The oven 10 further comprises a heating system for heating the cooking chamber or the food in the cooking chamber. As illustrated, the heating system comprises at least one heating element 18, which is typically either a gas or electric heating element. The heating element 18 can be mounted in any position suitable for heating the air in the cooking chamber 14, such as outside the cooking chamber 14 or at one of its sides, as is well-known in the oven art. Multiple heating elements 18 can be mounted in any combination of positions.

The oven 10 may comprise a circulation system 20 that circulates air and steam, when present, within the cooking chamber 14. The circulation system 20 can be any suitable system providing circulation, such as a fan, and can be mounted in any suitable location of the cooking chamber 14, such as in the rear.

While the cooking appliance is illustrated as a conventional oven, it can be any type of cooking appliance that has a cooking chamber that is heated to cook the food.

An atomizer 22 is provided in the oven. The atomizer 22 generates water particles, which are then converted to steam that is used in the cooking chamber. The heat from the cooking chamber 14 is used to convert the water particles to steam, which negates the need for the use of a separate heating system for generating steam and reduces the overall energy consumption of the oven when steam is used for cooking. The atomizer 22 is preferably mounted within the cabinet 12 by any suitable means. A control 23 linked to the atomizer 22 is located on the top of the oven 10 and can be in the form of a button or switch.

Figure 2:
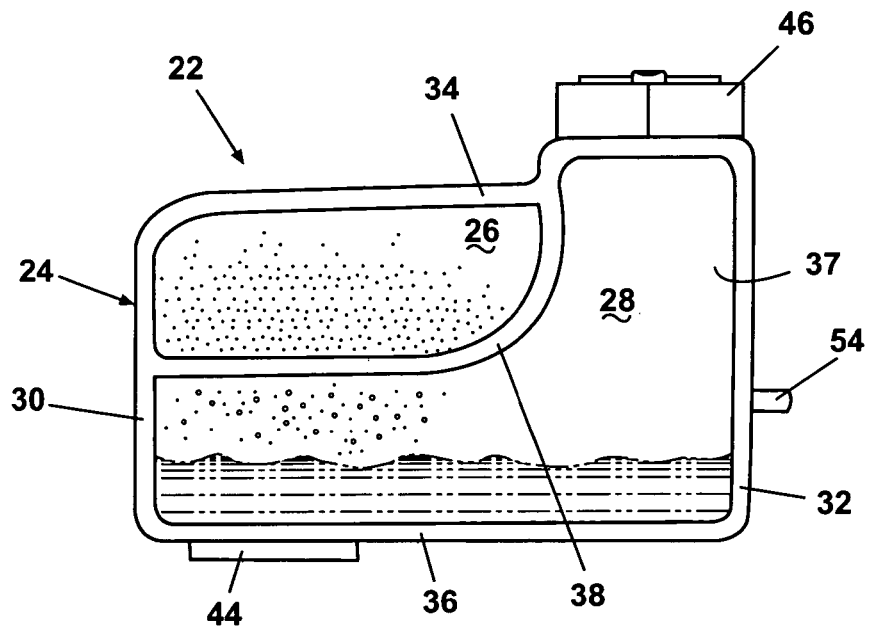
FIG. 2 is a schematic view of the atomizer of FIG. 1.
Figure 3:
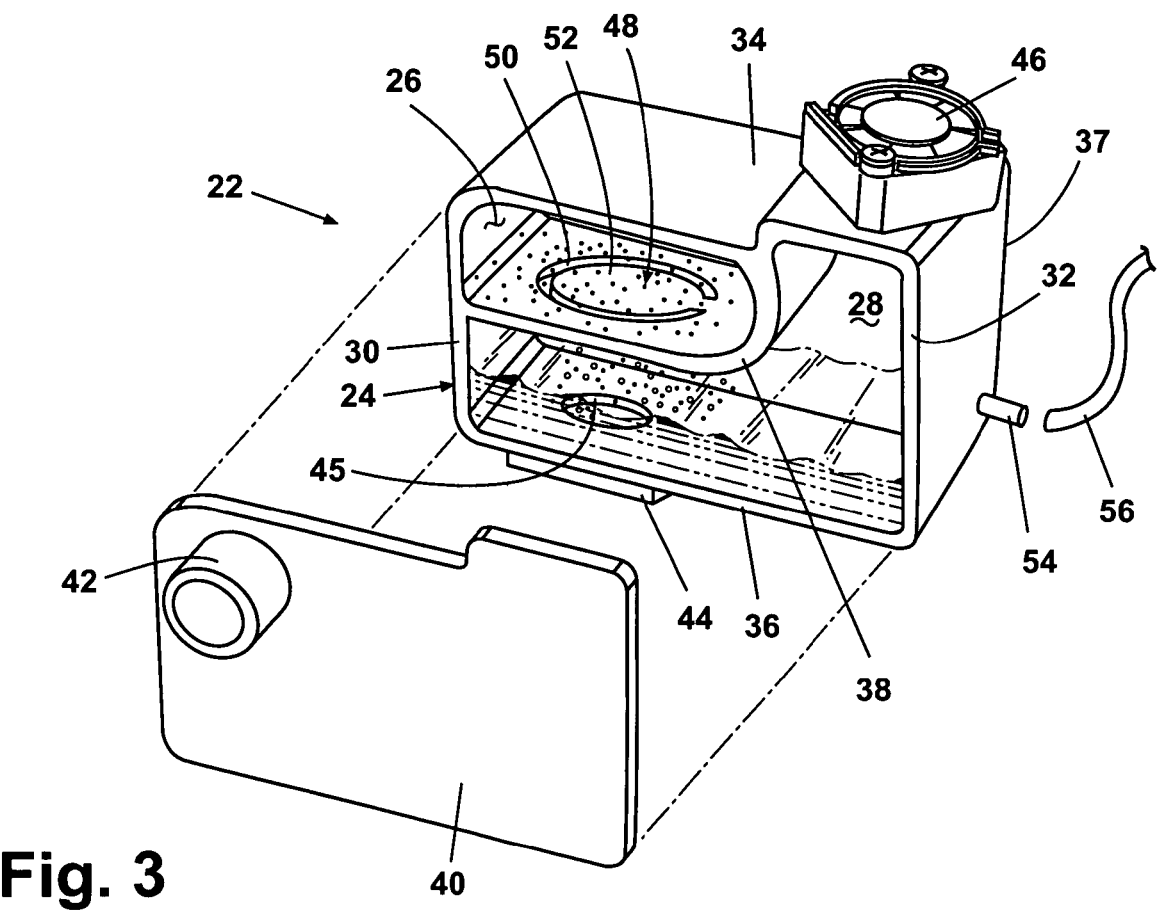
FIG. 3 is a perspective view of the atomizer of FIG. 1.

A specific example of a suitable atomizer is illustrated in FIGS. 2 and 3. For the purpose of describing the atomizer 22 of FIGS. 2 and 3, the directions of inward, outward, forward, rearward, top, and bottom are used with respect to the orientation of the atomizer 22 in FIG. 2. The atomizer 22 comprises an open-faced housing 24, which is closed by a cover 40. The housing 24 defines an upper chamber 26 and lower chamber 28. The upper chamber 26 is primarily for holding particles of water and the lower chamber 28 is primarily a reservoir for water. The housing 24 is preferably constructed of porcelain-coated steel, although it can be made of any suitable material. The housing 24 comprises a pair of spaced side walls 30, 32, a top wall 34, bottom wall 36, and a back wall 37. The housing 24 further comprises a divider wall 38, a portion of which is oriented approximately parallel to the top wall 34 and bottom wall 36. The divider wall 38 is interposed between the side walls 30, 32, top wall 34, bottom wall 36, and back wall 37 in any suitable manner effectively separating the upper chamber 26 from the lower chamber 28.

The cover 40 closes the open face of the housing and abuts the side walls 30, 32, top wall 34, bottom wall 36, and divider wall 38, and has an orientation approximately parallel to the back wall 37. The cover 40 can be fastened to the other elements of the housing 24 by any means suitable for creating an impermeable seal, such as by gluing or caulking. An integral outlet 42 extends outwardly from the portion of the cover 40 defining the foremost face of the upper chamber 26. The outlet 42 fluidly connects to the cooking chamber 14.

A liquid water inlet 54 supplies water to the lower chamber 28. The liquid inlet 54 can be configured for the unidirectional flow of liquid water into the lower chamber 28. As illustrated, the inlet 54 is connected to the opening 21 in the top of the oven 10 by a conduit 56 (FIGS. 1 and 3) to permit direct filling by the user. However, other methods and structures for supplying water to the conduit 56 may be used. For example, the conduit can be directly coupled to a household water supply. The conduit 56 can be coupled to the inlet 54 in any suitable manner creating a watertight seal and enabling liquid water flow to the inlet 54, such as by constructing the conduit 56 of resilient tubing adapted to fit tightly around and retain the inlet 54.

A piezoelectric vibrator 44 is mounted to a portion of the bottom wall 35 in which an opening 45 is formed. The piezoelectric vibrator 44 vibrates at an ultrasonic frequency and transmits the vibrations into the lower chamber 28 through the opening 45. In this way the piezoelectric vibrator 44 can vibrate the water contained in the lower chamber 28 and convert the water into particles.

A particle filter 48 is located between the lower chamber 28 and the upper chamber 26 and permits the transfer of water particles from the lower chamber 28 to the upper chamber 26. The particle filter 48 also retards the splashing of water from the lower chamber 28 into the upper chamber 26. As illustrated, the particle filter 48 comprises an opening 50 in the divider wall 38 and which fluidly connects the upper chamber 26 to the lower chamber 28. The particle filter 48 further comprises a particle deflector 52 formed from the divider wall 38 by the opening 50. The particle deflector 52 is located above the opening 45 in the bottom wall 36. The particle filter 48 and its deflector 52 are formed as part of the divider wall 38 for convenience. The particle filter 48 can be separate from the divider wall.

A fan 46 is mounted to a portion of the housing 24 and is in fluid communication with the lower chamber 28. The fan 46 can be any fan having a size and composition suitable for the purposes described herein. The fan 46 is configured to draw air from outside the housing 24, through the lower chamber 28, into the upper chamber 28, and out the outlet 42 into the cooking chamber.

A brief description of the operation of the oven 10 with the atomizer 22 will be helpful in understanding the invention. As the atomizer 22 does not contain its own heating source and relies upon the heated cooking chamber for converting the water particles into steam, the cooking chamber 14 should be heated prior to the introduction of water particles from the atomized. For the water particles to be converted to steam in the cooking chamber 14, the air in the cooking chamber 14 should be heated to a temperature appropriate for creating steam. This level should be at least 212° F. for the typical operating pressures of most ovens, which operate at atmospheric pressure, as this is the boiling temperature of water. It has been found that a temperature higher than the boiling temperature is beneficial. The higher temperature should be great enough such that all surfaces in the cooking chamber are at least the boiling temperature. In this way, any water particle that does not change phase after entering the cooking chamber 14, will change phase upon contact with the surfaces, which will prevent water from pooling on the surfaces. Pooling water can be detrimental to many oven surfaces, such a ceramic, where it can lead to cracking. An air temperature of 250° F. is typically great enough such that all surfaces within the cooking chamber 14 are at least 212° F.

Advantageously, cooking at a temperature of 250° F. requires little power relative to the total power available for cooking by the oven 10 and is well below most cooking temperatures. Typically, foods are cooked at a temperature between 300° F. and 450° F., with a temperature of approximately 530° F. using the total power available and being the maximum possible temperature for cooking. As the majority of power used to heat an oven escapes to the surrounding air as heat, cooking at a lower temperature than normal reduces power consumption and, consequently, reduces energy costs. Additionally, studies have shown that cooking at a lower temperature increases the nutritional value of the food being cooked.

Once the air in the cooking chamber 14 is heated to the appropriate temperature, the controller 23 activates the atomizer 22. The controller 23 can automatically activate the atomizer 22 or activate the atomizer in response to an input by the user. It is anticipated that a user will select a cycle that requires steam, such as bread proofing or baking of fish, and the controller 23 will take this input as a desire to generate steam in accordance with the cooking cycle.

The controller can also control the volume of liquid water in the lower chamber 28 by controller the valve in the inlet 54. Alternatively, the water can be manually filled each time. It is not germane to the invention how the water is supplied. There are many well known ways in which to supply water. The lower chamber 28 is filled with liquid water to a level such that the piezoelectric vibrator 44 is covered by liquid water, but the liquid water is not in contact with the particle deflector 52.

The piezoelectric vibrator 44 is actuated and vibrates to excite the liquid water molecules, resulting in the separation of a portion of the liquid water into liquid water particles in the space above the liquid water. Larger liquid water particles are created above the center of the piezoelectric vibrator 44 due to bubbling. These larger liquid water particles are prevented from moving into the upper chamber 26 by the particle deflector 52 of the particle filter 48. Smaller liquid water particles created by the piezoelectric vibrator 44 have a tendency to spread outwardly above the piezoelectric vibrator 44. It is preferred that the particles be of such a size that they are buoyant within the air. Buoyant particles are particles of this size will not immediately fall back into the water. Primarily, buoyant particles are of a size that they tend to stay in mixture with the air in the cooking chamber and evaporate before contacting any surface of the cooking chamber.

The fan 46 is activated by the controller to create a positive pressure in the lower chamber 28, which in turn creates a first pressure gradient in the atomizer 22. The first pressure gradient propels the smaller liquid water particles through the opening 50 of the particle filter 48 in the divider wall 38. The smaller liquid water particles then accumulate in the upper chamber 26. Any condensation resulting from the collision of liquid water particles in the upper chamber 26 is directed back down into the lower chamber 28 by the sloping of the divider wall 38. The upper chamber 26 also has a positive pressure, which creates a second pressure gradient. This second pressure gradient instigates the movement of the liquid water particles from the upper chamber 26 to the outlet 42 of the cover 40. The liquid water particles move through the outlet 42 and into the cooking chamber 14 of the oven 10.

Once in the cooking chamber 14, the liquid water particles are exposed to the heat of the air in the cooking chamber 14. Since the air in the cooking chamber has been heated to a sufficient temperature, it causes the phase change of the water from liquid to gas, producing steam. The steam is then circulated throughout the cooking chamber along with the heated air using the circulation system 20.

The piezo type ultrasonic atomizer described and illustrated herein provides a cost-efficient means of cooking with steam. The atomizer is designed to for use with any conventional oven. The atomizer also eliminates the need for the separate heating element included in steam generating apparatuses. By using the heating element already present in the oven to provide the energy needed to create steam, the piezo type ultrasonic atomizer greatly diminishes the additional costs associated with traditional steam-assisted cooking.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of forming steam in a cooking chamber of an oven having a housing having a plurality of surfaces defining the cooking chamber and an atomizer having an outlet fluidly coupled to the cooking chamber, comprising:

atomizing a liquid to form a plurality of particles of the liquid that are of a size such that they are buoyant within air of the atomizer and do not immediately fall back into the liquid and stay in mixture with the air;

introducing the buoyant particles into the cooking chamber by forming an air pressure gradient between the atomizer and the cooking chamber to propel the mixture of air and buoyant particles into the cooking chamber; and maintaining a temperature of the air in the cooking chamber at a temperature greater than the liquid to gas phase change temperature of the liquid and sufficient to maintain the plurality of surfaces at a temperature greater than the liquid to gas phase change temperature of the liquid, wherein the particles introduced into the cooking chamber change phase from liquid to gas to form the steam without the particles pooling on any surfaces of the housing.

2. The method of claim 1, wherein the particles are of a size such that each of the particles completely changes phase from liquid to gas upon contact with the housing defining the cooking chamber.

3. The method of claim 2, wherein the particles are of a size such that each of the particles completely changes phase from liquid to gas upon contact with the air in the cooking chamber.

4. The method of claim 3, wherein the temperature of the air is maintained at a temperature such that the housing is at least at a boiling point of the liquid.

5. The method of claim 4, wherein in the liquid is water.

6. The method of claim 1, wherein the particles are of a size such that each of the particles completely changes phase from liquid to gas upon contact with the air in the cooking chamber.

7. The method of claim 6, wherein the temperature of the air is maintained at a temperature such that the housing is at least at a boiling point of the liquid.

8. The method of claim 1, wherein the atomizing of the liquid comprises vibrating the liquid.

9. The method of claim 8, wherein vibrating the liquid comprises ultrasonically vibrating the liquid.

10. The method of claim 1, and further comprising forcing air into the particles to place them under pressure.

11. The method of claim 1, wherein the temperature of the air is maintained at a temperature such that the housing is at least at a boiling point of the liquid.

12. The method of claim 11, wherein the temperature of the air is at least 212° F.

13. The method of claim 12, wherein the temperature of the air is at least 250° F.

* * * * *